United States Patent
Sugiura

(10) Patent No.: US 9,303,757 B2
(45) Date of Patent: Apr. 5, 2016

(54) SADDLE-TYPE VEHICLE

(71) Applicant: HONDA MOTOR CO., LTD., Tokyo (JP)

(72) Inventor: Hiroyuki Sugiura, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 14/668,280

(22) Filed: Mar. 25, 2015

(65) Prior Publication Data

US 2015/0276049 A1 Oct. 1, 2015

(30) Foreign Application Priority Data

Mar. 31, 2014 (JP) .................. 2014-073551

(51) Int. Cl.
| | |
|---|---|
| *F16D 25/10* | (2006.01) |
| *F16H 61/00* | (2006.01) |
| *B62K 11/04* | (2006.01) |
| *F02B 61/02* | (2006.01) |
| *F16D 21/06* | (2006.01) |
| *F16D 48/02* | (2006.01) |

(52) U.S. Cl.
CPC ............ *F16H 61/0009* (2013.01); *B62K 11/04* (2013.01); *F02B 61/02* (2013.01); *F16D 21/06* (2013.01); *F16D 25/10* (2013.01); *F16D 2021/0653* (2013.01); *F16D 2048/0287* (2013.01); *F16D 2300/26* (2013.01)

(58) Field of Classification Search
CPC . F16H 61/0009; F16D 25/10; F16D 2300/26; F16D 2048/0287; F16D 2021/0653; F02B 61/02
See application file for complete search history.

(56) References Cited

U.S. PATENT DOCUMENTS

| | | | | |
|---|---|---|---|---|
| 5,669,479 | A  * | 9/1997 | Matsufuji | F16D 25/10 184/6.12 |
| 2001/0020402 | A1* | 9/2001 | Shichinohe | F16H 45/02 74/730.1 |
| 2008/0128239 | A1* | 6/2008 | Ogasawara | B60K 17/02 192/48.611 |
| 2009/0084651 | A1* | 4/2009 | Fujimoto | F16D 25/10 192/48.611 |
| 2012/0247904 | A1* | 10/2012 | Mitsubori | F01M 1/16 192/48.601 |
| 2012/0298466 | A1* | 11/2012 | Nedachi | F16D 48/06 192/84.6 |
| 2014/0046562 | A1* | 2/2014 | Minami | B60W 10/02 701/67 |
| 2014/0046563 | A1* | 2/2014 | Minami | B60W 10/02 701/68 |

FOREIGN PATENT DOCUMENTS

JP 2010-255840 A 11/2010

* cited by examiner

*Primary Examiner* — Kevin Hurley
*Assistant Examiner* — Gabriela C. Craciun
(74) *Attorney, Agent, or Firm* — Birch, Stewart, Kolasch & Birch, LLP

(57) ABSTRACT

A saddle-type vehicle that allows an oil pressure adjusting system for a hydraulic clutch to be optimally disposed in a power unit in which a crankshaft is disposed along the vehicle body front-rear direction. A crankshaft of an engine is disposed along the vehicle front-rear direction. An oil pressure adjusting system that operates hydraulic clutches is attached to a clutch cover of a power unit. The oil pressure adjusting system is disposed so as to overlap with the hydraulic clutches as viewed in the axial direction of the crankshaft.

15 Claims, 11 Drawing Sheets

SADDLE-TYPE VEHICLE

CROSS-REFERENCE TO RELATED APPLICATIONS

The present application claims priority under 35 USC 119 to Japanese Patent Application No. 2014-073551 filed Mar. 31, 2014 the entire contents of which are hereby incorporated by reference.

BACKGROUND OF THE INVENTION

1. Field of the Invention

The present invention relates to a saddle-type vehicle in which a hydraulic clutch is incorporated in a power unit having an engine and a transmission.

2. Description of Background Art

Some saddle-type vehicles, such as motorcycles, include a hydraulic clutch to connect and disconnect power that is incorporated in a power unit. The operation oil pressure of the hydraulic clutch in this kind of vehicle is controlled by an oil pressure adjusting system formed of a spool valve of an electromagnetically-controlled type and so forth. See, for example, Japanese Patent Laid-Open No. 2010-255840.

In a saddle-type vehicle described in Japanese Patent Laid-Open No. 2010-255840, a so-called transverse engine is used as the power unit wherein a crankshaft is disposed along the vehicle width direction. In this saddle-type vehicle, a hydraulic clutch disposed at an end part of a main shaft of a transmission is disposed at one end part of the power unit in the vehicle width direction. Furthermore, an oil pressure adjusting system is disposed at an upper position that does not overlap with the hydraulic clutch in the axial direction at the one end part of the power unit in the vehicle width direction. This placement of the oil pressure adjusting system can prevent the oil pressure adjusting system from interfering with a road surface and so forth when the vehicle is tilted toward a lateral side for example.

In some cases, a so-called longitudinal engine, in which a crankshaft is disposed along the vehicle body front-rear direction, is used in the power unit. For a saddle-type vehicle equipped with such a longitudinal engine, there is a demand to optimally dispose the oil pressure adjusting system for the hydraulic clutch.

SUMMARY AND OBJECTS OF THE INVENTION

According to an embodiment of the present invention, a saddle-type vehicle allows an oil pressure adjusting system for a hydraulic clutch to be optimally disposed in a power unit in which a crankshaft is disposed along the vehicle body front-rear direction.

To solve the above-described problem, a saddle-type vehicle according to an embodiment of the present invention, is provided as a saddle-type vehicle in which a power unit (PU) having an engine (11) and a transmission (25) includes hydraulic clutches (50A, 50B) that connect and disconnect power between the engine (11) and the transmission (25), a clutch cover (47) that covers an outside of the hydraulic clutches (50A, 50B), and an oil pressure adjusting system (40) that is attached to the clutch cover (47) and controls an operation oil pressure of the hydraulic clutches (50A, 50B). The power unit (PU) is supported by a vehicle body frame (5). In this saddle-type vehicle, a crankshaft (15) of the engine (11) is disposed along a vehicle front-rear direction, and the oil pressure adjusting system (40) is so disposed as to overlap with the hydraulic clutches (50A, 50B) as viewed in an axial direction of the crankshaft (15).

According to an embodiment of the present invention, the saddle-type vehicle is a vehicle in which the crankshaft (15) of the engine (11) is disposed along the vehicle front-rear direction and therefore the clutch cover (47) is disposed at substantially a center in the vehicle width direction at an end part of the power unit (PU) in the axial direction. In such a vehicle, the oil pressure adjusting system (40) is disposed on the clutch cover (47) in such a manner as to overlap with the hydraulic clutches (50A, 50B) as viewed in the axial direction and thus a projection thereof to lateral sides of the vehicle is avoided.

According to an embodiment of the present invention, a structure may be employed in which the oil pressure adjusting system (40) is disposed below a main shaft (16) to which the hydraulic clutches (50A, 50B) are attached. In addition, an oil pressure passage that connects an output part of the oil pressure adjusting system (40) to the hydraulic clutches (50A, 50B) has a circular arc part (68, T2) that bypasses the main shaft (16).

In this case, because the oil pressure adjusting system (40) and the oil pressure passage thereof are disposed on a lower side of the main shaft (16), a centroid position of the power unit (PU) is lowered. Furthermore, because the circular arc part (68, T2) of the oil pressure passage is disposed so as to bypass the main shaft (16), placement of clutch-peripheral components around the main shaft (16) becomes easy.

The engine (11) may have a pair of cylinder parts (13L, 13R) on left and right sides and exhaust pipes (90) extending from lower parts of the cylinder parts (13L, 13R) toward a vehicle rear side may be each connected to a respective one of the cylinder parts (13L, 13R). Further, the oil pressure adjusting system (40) may be disposed between the exhaust pipes (90) on the left and right sides.

According to an embodiment of the present invention, the oil pressure adjusting system (40) having a smaller volume than the general part of the clutch cover (47) is disposed at substantially the center in the vehicle width direction at the end part of the power unit (PU) in the axial direction. Therefore, the left and right exhaust pipes (90) can be brought sufficiently close to the power unit (PU) without interfering with components around the power unit (PU). Thus, the left and right exhaust pipes (90) can be disposed close to the power unit (PU) and the vehicle width of the saddle-type vehicle can be effectively narrowed.

According to an embodiment of the present invention, an oxygen sensor (95) may be disposed at substantially the same vehicle anteroposterior position as the oil pressure adjusting system (40) on the exhaust pipe (90) in such a manner so as to be oriented toward the oil pressure adjusting system (40).

According to an embodiment of the present invention, the oxygen sensor (95) protruding from the exhaust pipe (90) is disposed so as to be oriented toward the oil pressure adjusting system (40) disposed at the center of the power unit (PU) in the vehicle width direction. This can further narrow the vehicle width of the saddle-type vehicle while avoiding interference between components around the exhaust pipe (90) and the power unit (PU).

According to an embodiment of the present invention, in a vehicle wherein the crankshaft of the engine is disposed along the vehicle front-rear direction, the oil pressure adjusting system is disposed so as to overlap with the hydraulic clutches as viewed in the axial direction. Thus, the oil pressure adjusting system and the hydraulic clutches can be disposed close to each other without projecting the oil pressure adjusting system to the lateral sides of the vehicle. Therefore, according to this invention, it is possible to achieve protection of the oil pressure adjusting system when the vehicle falls toward a lateral side. In addition, an improvement in the actuation responsiveness of the hydraulic clutches is obtained due to shortening of the oil passage length between the oil pressure adjusting system and the hydraulic clutches.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
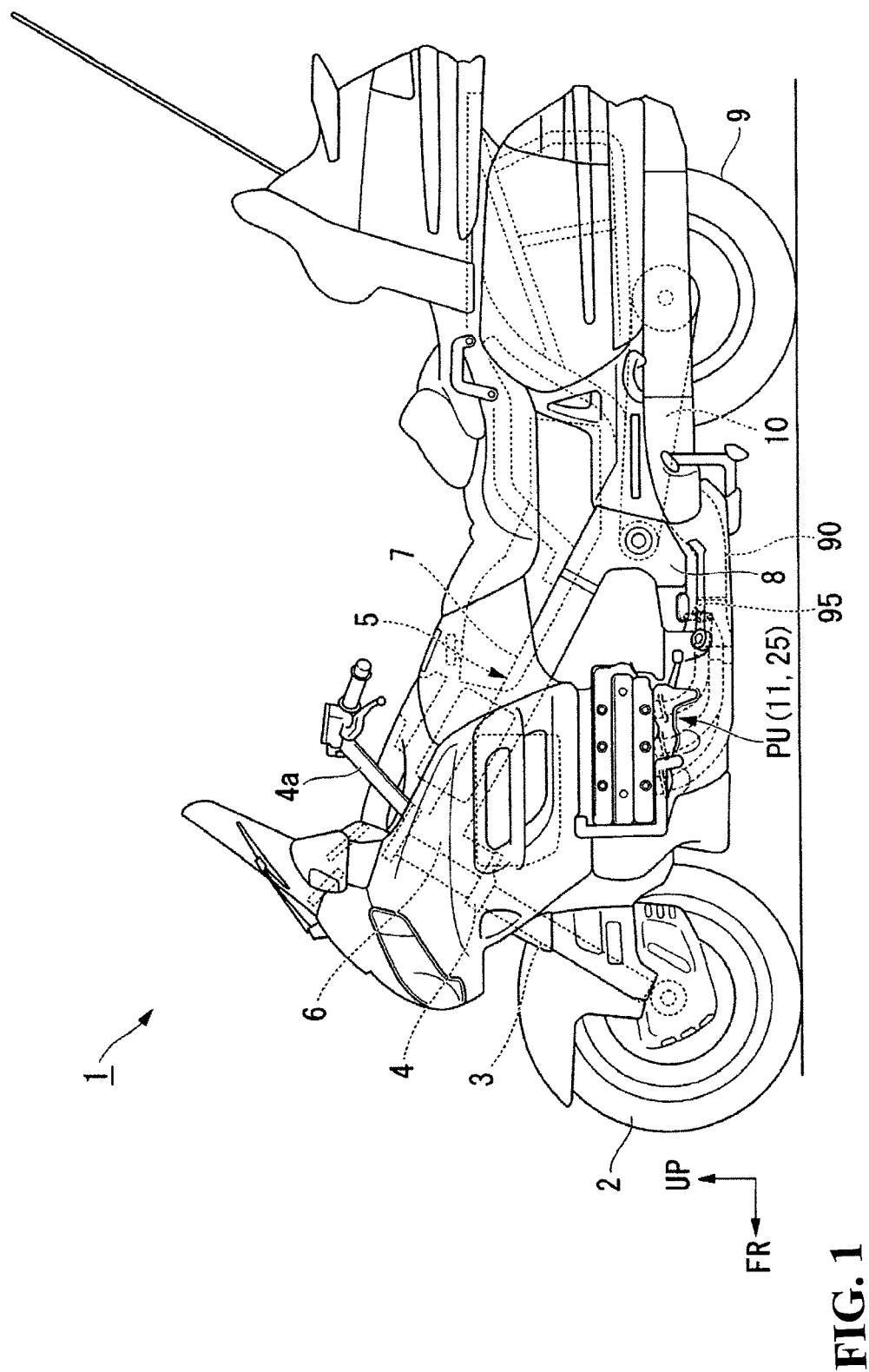
FIG. 1 is a left side view of a motorcycle according to an embodiment of this invention.

One embodiment of this invention will be described below based on the drawings. Directions such as front, rear, left, and right directions in the following description are the same as directions in a vehicle to be described below unless otherwise noted. Furthermore, at appropriate places in the drawings, an arrow FR indicates the vehicle front side, an arrow LH indicates the vehicle left side, and an arrow UP indicates the vehicle upper side.

FIG. 1 is a diagram showing the left side surface of a motorcycle 1 as one form of a saddle-type vehicle.

In the motorcycle 1 shown in FIG. 1, its front wheel 2 is journaled at the lower end parts of a pair of left and right front forks 3 and the upper parts of the left and right front forks 3 are steerably supported by a head pipe 6 at the front end of a vehicle body frame 5 with the intermediary of a steering stem 4. A handlebar 4a for steering the front wheel is attached to the upper part of the steering stem 4.

A pair of left and right main frames 7 extend from the head pipe 6 toward the lower rear side obliquely and upper end parts of pivot frames 8 are continuous with the rear end parts of the left and right main frames 7. On the lower side of the left and right main frames 7 and on the front side of the left and right pivot frames 8, a power unit PU is mounted that includes a horizontally opposed six-cylinder engine 11 and a multi-stage transmission 25.

A front end part of a swingarm 10 to journal a rear wheel 9 is supported by the left and right pivot frames 8 swingably in the upward-downward direction. The swingarm 10 is a cantilever type. More specifically, the rear wheel 9 is journaled at the rear end part of a hollow right arm. In the right arm of the swingarm 10, a driveshaft (not shown) is inserted that extends from the transmission 25 of the power unit PU. Power transmission between the power unit PU and the rear wheel 9 is carried out via a power train system including this driveshaft.

Figure 2:
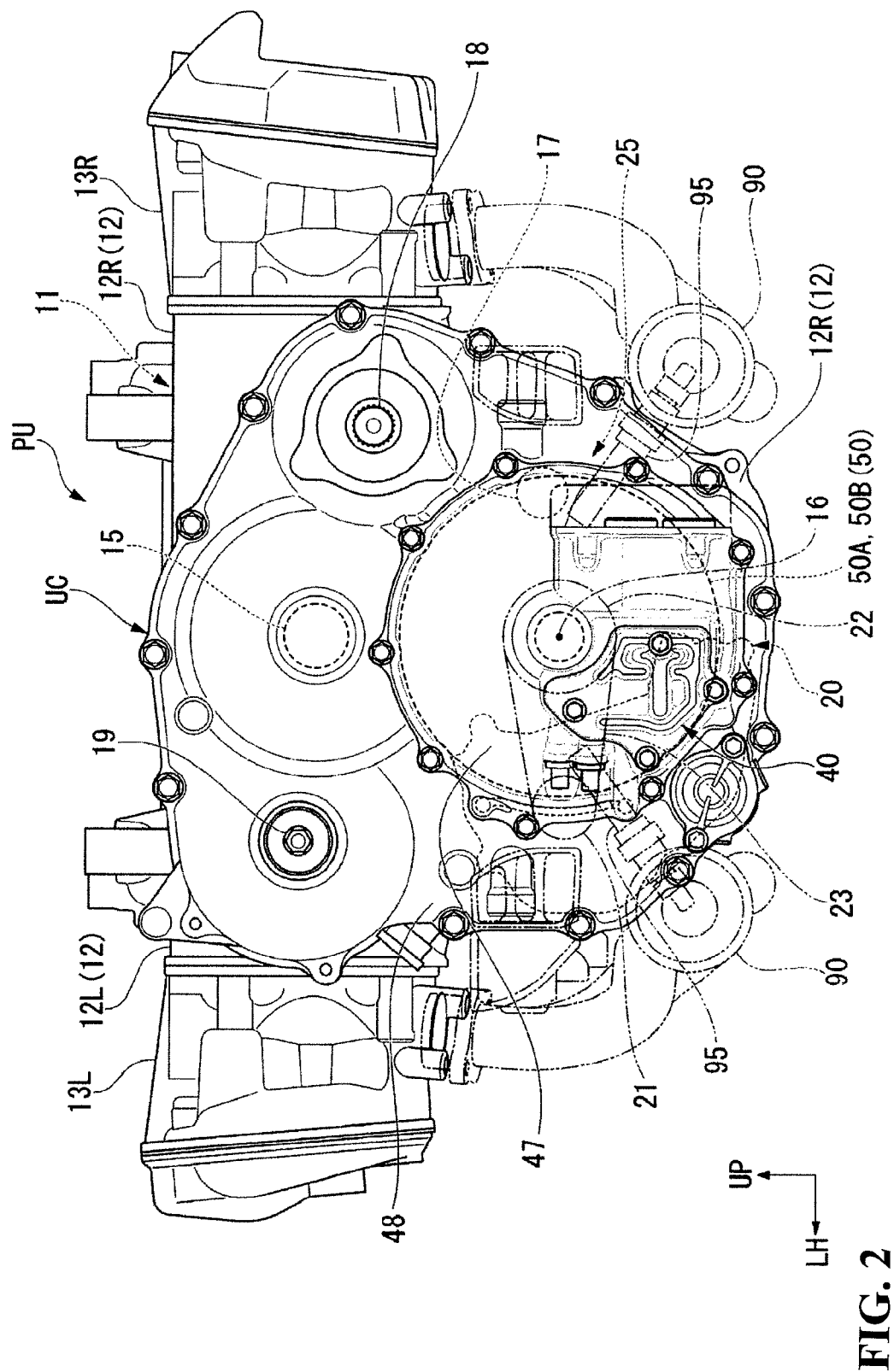
FIG. 2 is a rear view of a power unit according to the embodiment of this invention.
Figure 3:
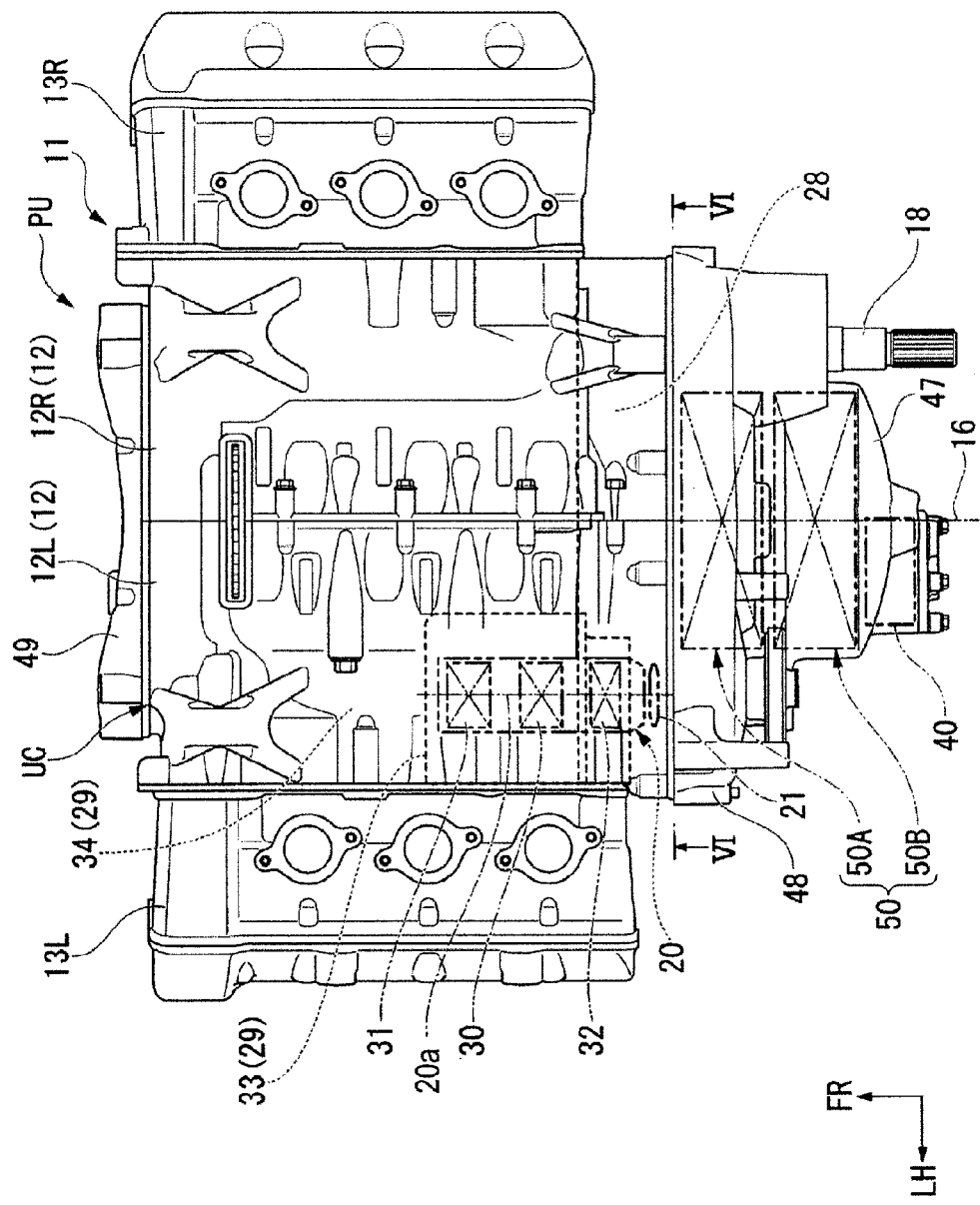
FIG. 3 is a plan view of the power unit according to the embodiment of this invention.
Figure 4:
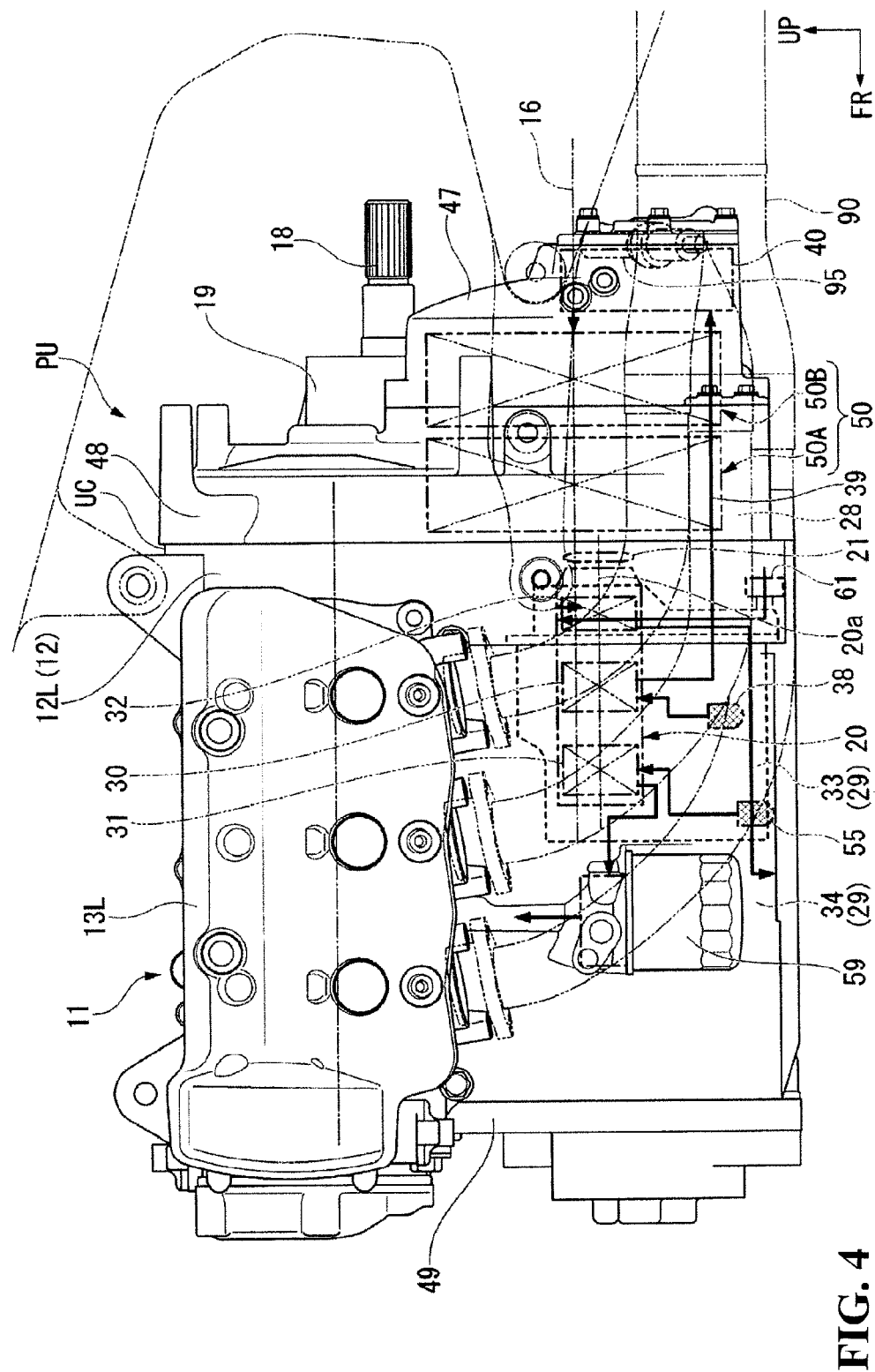
FIG. 4 is a left side view of the power unit according to the embodiment of this invention.

FIG. 2 is a diagram of the power unit PU as viewed from the rear side. FIGS. 3 and 4 are diagrams of the power unit PU as viewed from the upper side and the left side, respectively.

As shown in these diagrams, in the power unit PU of this embodiment, a left cylinder part 13L and a right cylinder part 13R are so provided as to project substantially horizontally on both left and right sides of the upper part of a crankcase 12. In each of the left cylinder part 13L and the right cylinder part 13R, three cylinders are provided that are juxtaposed in the front-rear direction. The crankcase 12 is divided into two blocks across the center in the left-right direction and is formed by the mutual joining of a left case half body 12L as the left block and a right case half body 12R as the right block.

Intake ports and exhaust ports (neither is shown) are made on the upper surface side and the lower surface side of each of the left cylinder part 13L and the right cylinder part 13R of the power unit PU. To each exhaust port, an exhaust pipe 90 is connected that extends downwardly and then bends to extend toward the vehicle rear side.

A front crank cover 49 is fixed by fastening to the end surface of the crankcase 12 on the front side and a rear crank cover 48 is fixed by fastening to the end surface of the crankcase 12 on the rear side. An opening (not shown) is made at the lowered center of the rear crank cover 48 and the opening is sealed by a clutch cover 47 that swells into a bowl shape toward the vehicle body rear side.

In the case of this embodiment, a power unit case UC is formed of the crankcase 12, the left cylinder part 13L, the right cylinder part 13R, the front crank cover 49, the rear crank cover 48, the clutch cover 47, and so forth.

The power unit PU includes a crankshaft 15 of the engine 11 along the vehicle front-rear direction, a main shaft 16 of the transmission 25 disposed in parallel to the crankshaft 15 below the crankshaft 15, a countershaft 17 of the transmission 25 disposed in parallel to the main shaft 16 on the right side of the main shaft 16, an output shaft 18 disposed in parallel to the countershaft 17 on the right upper side of the countershaft 17, and a generator shaft 19 disposed in parallel to the crankshaft 15 on the left side of the crankshaft 15. The engine 11 employed in the power unit PU according to this embodiment is a so-called longitudinal engine in which the crankshaft 15 is disposed along the vehicle body front-rear direction when the engine is mounted in the vehicle.

Regarding the power unit PU, the direction along which the crankshaft 15 and the main shaft 16 extend will be referred to as the axial direction unless otherwise noted.

To the crankshaft 15, pistons (not shown) reciprocably housed in the left cylinder part 13L and the right cylinder part 13R are coupled with the intermediary of connecting rods (not shown). The crankshaft 15 converts the linear motion of the pistons in association with combustion of gasoline to rotational motion and outputs it to the external.

The main shaft 16 and the countershaft 17 are provided with gear trains of a plurality of stages enabling establishment of selective power transmission at different gear ratios. The combination of meshing of gear elements of the gear trains is changed as appropriate by shift operation by a driver. Furthermore, the output shaft 18 of the transmission 25 projects from the rear part of the crankcase 12 toward the vehicle body rear side. The output shaft 18 receives power from the countershaft 17 to rotate, and transmits the rotation to the rear wheel 9 via the power train system of the driveshaft and so forth.

A primary drive gear (not shown) is attached to the rear end side of the crankshaft 15 and a clutch system (DCT) 50 of a twin-clutch type having a pair of hydraulic clutches 50A and 50B is attached to the rear end side of the main shaft 16. The main shaft 16 of this embodiment has a first shaft holding gears corresponding to odd-numbered shifting stages and a second shaft holding gears corresponding to even-numbered shifting stages although detailed diagrammatic representation is omitted. To the power input part of the clutch system 50, a primary driven gear (not shown) that meshes with the primary drive gear on the side of the crankshaft 15 is rotatably attached. The respective hydraulic clutches 50A and 50B as front and rear clutches of the clutch system 50 selectively connect the primary driven gear to the first shaft and the second shaft according to gear shifting of the transmission 25. Each of the hydraulic clutches 50A and 50B is controlled based on oil pressure adjusted based on a control signal of a controller (not shown). The hydraulic clutches 50A and 50B are disposed in a lower-side region in the power unit case UC below the crankshaft 15.

A pump unit 20 wherein a plurality of pumps are integrally incorporated is disposed on the left lower side of the left case half body 12L of the crankcase 12. As shown in FIGS. 3 and 4, this pump unit 20 has a common axis part 20a and a pump gear 21 that is integrally attached to one end of the axis part 20a. As shown in FIG. 2, a pump drive gear 22 is integrally rotatably joined to the primary driven gear on the main shaft 16 and a transmission chain 23 is passed around the pump drive gear 22 and the pump gear 21. The rotational power of the crankshaft 15 is transmitted to the axis part 20a of the pump unit 20 via the primary drive gear, the primary driven gear, the pump drive gear 22, the transmission chain 23, and the pump gear 21.

At the rear part of the crankcase 12, a rear-part partition (not shown) is formed. It separately forms a major space part in the crankcase 12 and a space part in which mainly the hydraulic clutches 50A and 50B are housed at the rear part of the crankcase 12. In the space part sandwiched between the rear crank cover 48 fixed to the rear part of the crankcase 12 by fastening and this rear-part partition, the above-described hydraulic clutches 50A and 50B, the primary drive gear, the primary driven gear, the pump gear 21, and so forth are disposed. This space part sandwiched between the rear crank cover 48 and the rear-part partition is deemed as a clutch chamber 28.

In the major space part in the crankcase 12 separately formed by the rear-part partition, components around the crankshaft 15 of the engine 11 and the gear group of the transmission 25 are disposed. In addition, the major part of the above-described pump unit 20 is also disposed. The lower-side region of this space part is used as an oil reservoir 29 in which to accumulate oil used for lubrication of the engine 11 and the transmission 25, actuation of the hydraulic clutches 50A and 50B, and so forth.

The above-described pump unit 20 has an actuation oil pump 30 for pumping oil into the hydraulic clutches 50A and 50B, a lubrication oil pump 31 to pump oil for lubricating the respective parts of the engine 11 and the transmission 25, and a scavenging pump 32 to suck up oil that has flowed into the clutch chamber 28 and send it to the oil reservoir 29. The scavenging pump 32 lowers the liquid surface of the oil in the clutch chamber 28 by sucking up the oil from the bottom side of the clutch chamber 28 and sending it to the oil reservoir 29, and thereby suppresses increase in the actuation resistance of the hydraulic clutches 50A and 50B due to immersion of the hydraulic clutches 50A and 50B in the oil.

Arrows in FIG. 4 show schematic flows of the oil in the power unit PU.

As shown in FIG. 4, the oil supply system of the power unit PU is composed of three oil supply systems, i.e. actuation oil supply system, lubrication oil supply system, and scavenged oil supply system, in a rough classification. In these three oil supply systems, sending and feeding of oil is performed by using the three oil pumps (actuation oil pump 30, lubrication oil pump 31, and scavenging pump 32) in the pump unit 20 as the respective oil pressure sources.

The inside of the oil reservoir 29 is separated into an actuation oil storage chamber 33 and a lubrication oil reservoir 34 in the peripheral area thereof. The actuation oil storage chamber 33 stores oil used mainly in the actuation oil supply system and the lubrication oil reservoir 34 stores oil used mainly in the lubrication oil supply system. Furthermore, the oil sucked up from the clutch chamber 28 by the scavenging pump 32 is returned into the lubrication oil reservoir 34.

As illustrated in FIG. 4, oil strainers 38, 55 and 61 are provided on the respective intake sides of the actuation oil pump 30, the lubrication oil pump 31, and the scavenging pump 32. A lubrication oil filter 59 is provided on the discharge side of the lubrication oil pump 31.

An oil passage 39 connected to the actuation oil pump 30 on the discharge side extends to the rear side of the rear crank cover 48 as shown by an arrow in FIG. 4 and is connected to an oil pressure adjusting system 40 provided at the rear part of the clutch cover 47. The oil pressure adjusting system 40 is a device to adjust the pressure of oil supplied to the respective hydraulic clutches 50A and 50B of the clutch system 50 and the supply pressure of the oil is adjusted based on control by the controller (not shown) according to the driving condition of the vehicle and so forth.

Figure 5:
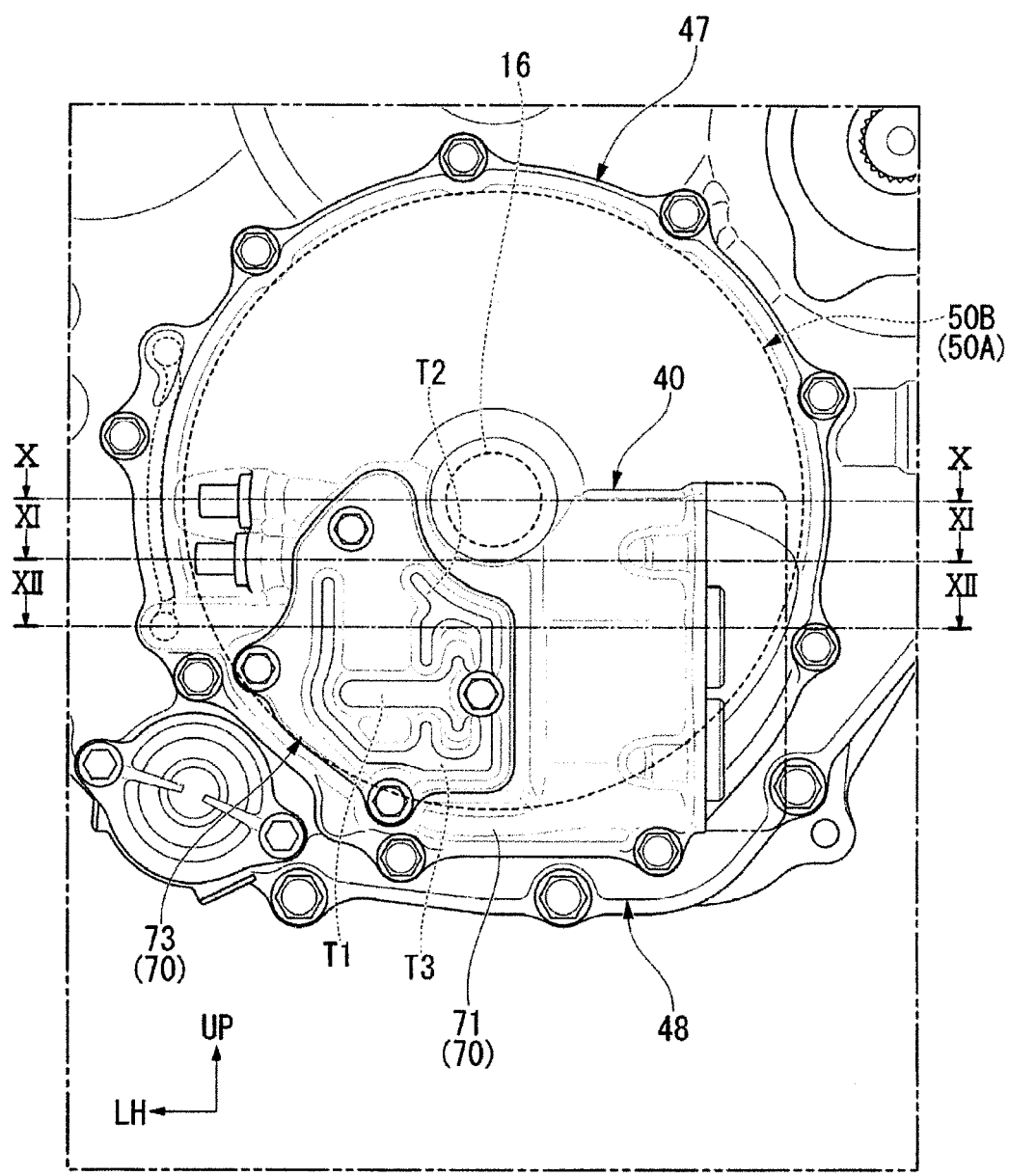
FIG. 5 is a rear view of the power unit according to the embodiment of this invention.
Figure 6:
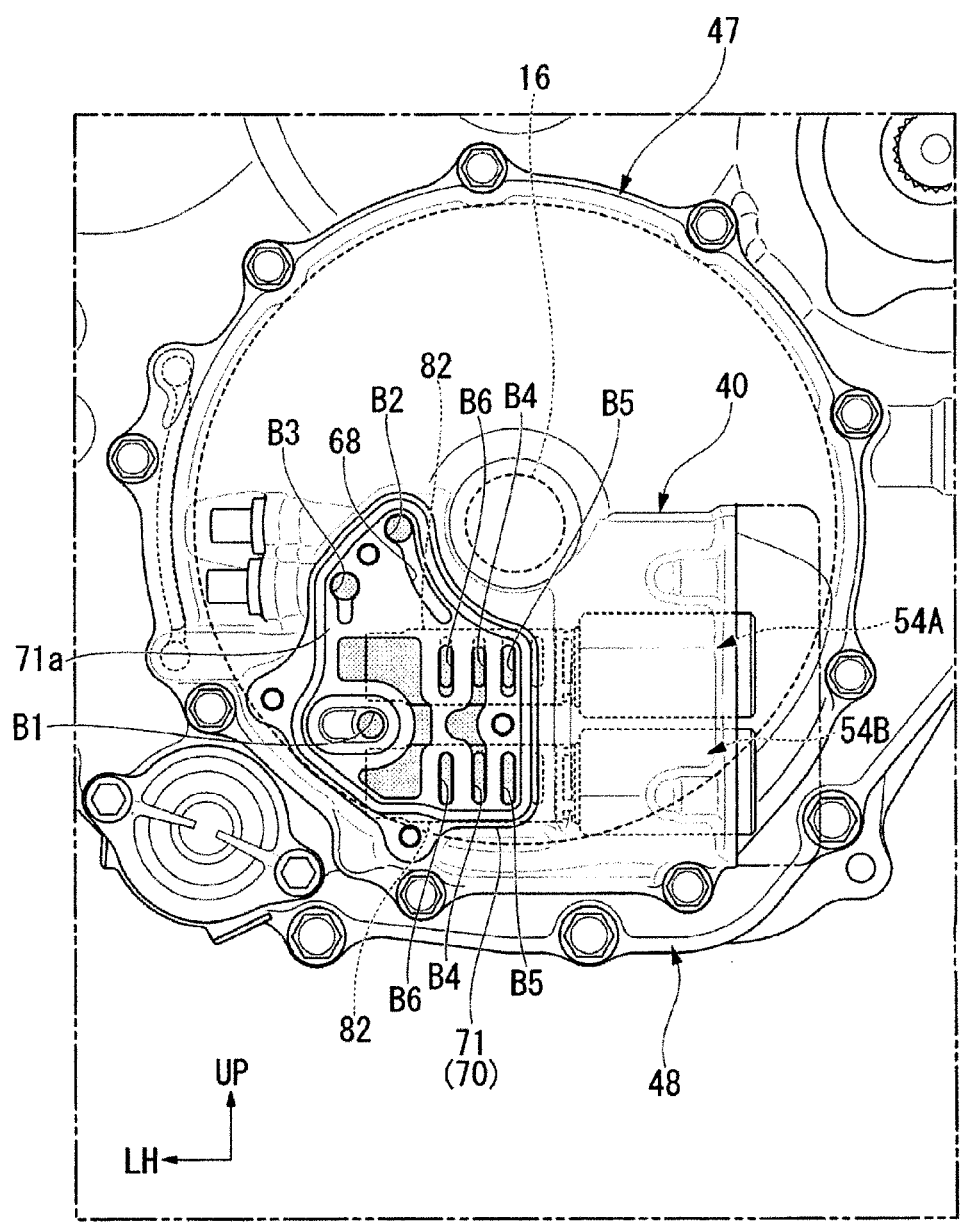
FIG. 6 is a rear view of the power unit according to the embodiment of this invention from which a partition plate and a passage cover of an oil pressure adjusting system are removed.

FIG. 5 is an enlarged view showing the part to which the oil pressure adjusting system 40 is attached in the power unit PU. FIG. 6 is an enlarged view showing the part to which the oil pressure adjusting system 40 is attached with part of components removed.

As shown in FIGS. 5 and 6, the oil pressure adjusting system 40 is provided on the rear surface side (vehicle body rear side) of the clutch cover 47. More specifically, the oil pressure adjusting system 40 is provided at a position that overlaps with the lower half parts of the hydraulic clutches 50A and 50B as viewed in the axial direction in a region on the lower side of the main shaft 16 in the rear surface of the clutch cover 47.

For the oil pressure adjusting system 40, a casing portion 70 has a casing main body part 71 that is formed so as to swell rearwardly relative to the bowl-shaped general surface of the clutch cover 47 and a passage cover 73 that covers part of the rear surface of the casing main body part 71 and forms internal passages. This casing portion 70 swells rearwardly in the region on the lower side of the main shaft 16, which overlaps with the lower half parts of the hydraulic clutches 50A and 50B as viewed in the axial direction, in the rear surface of the clutch cover 47.

The oil passage 39 on the discharge side of the actuation oil pump 30 shown in FIG. 4 bifurcates in the oil pressure adjusting system 40. Oil in the respective passages arising from the bifurcation is adjusted in pressure by valve units 54A and 54B in the oil pressure adjusting system 40 and is supplied to the corresponding hydraulic clutches 50A and 50B.

In the casing portion 70 of the oil pressure adjusting system 40, the valve units 54A and 54B are disposed and introduction passages and control pressure passages leading to the respective valve units 54A and 54B are formed.

Figure 7:
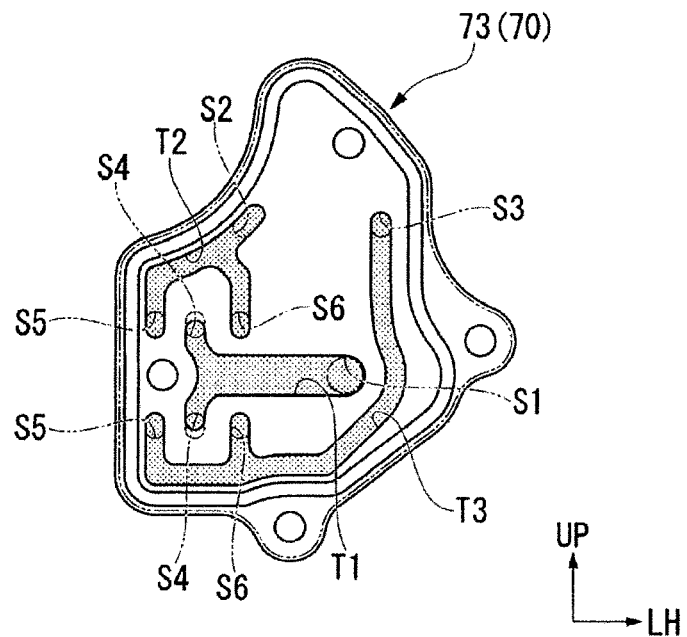
FIG. 7 is a diagram showing the back surface of the passage cover of the oil pressure adjusting system according to the embodiment of this invention.
Figure 8:
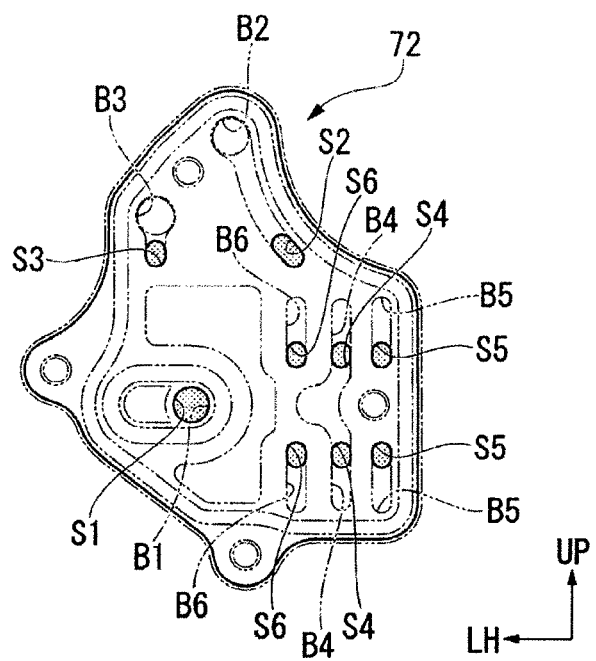
FIG. 8 is a front view of the partition plate of the oil pressure adjusting system according to the embodiment of this invention.
Figure 9:
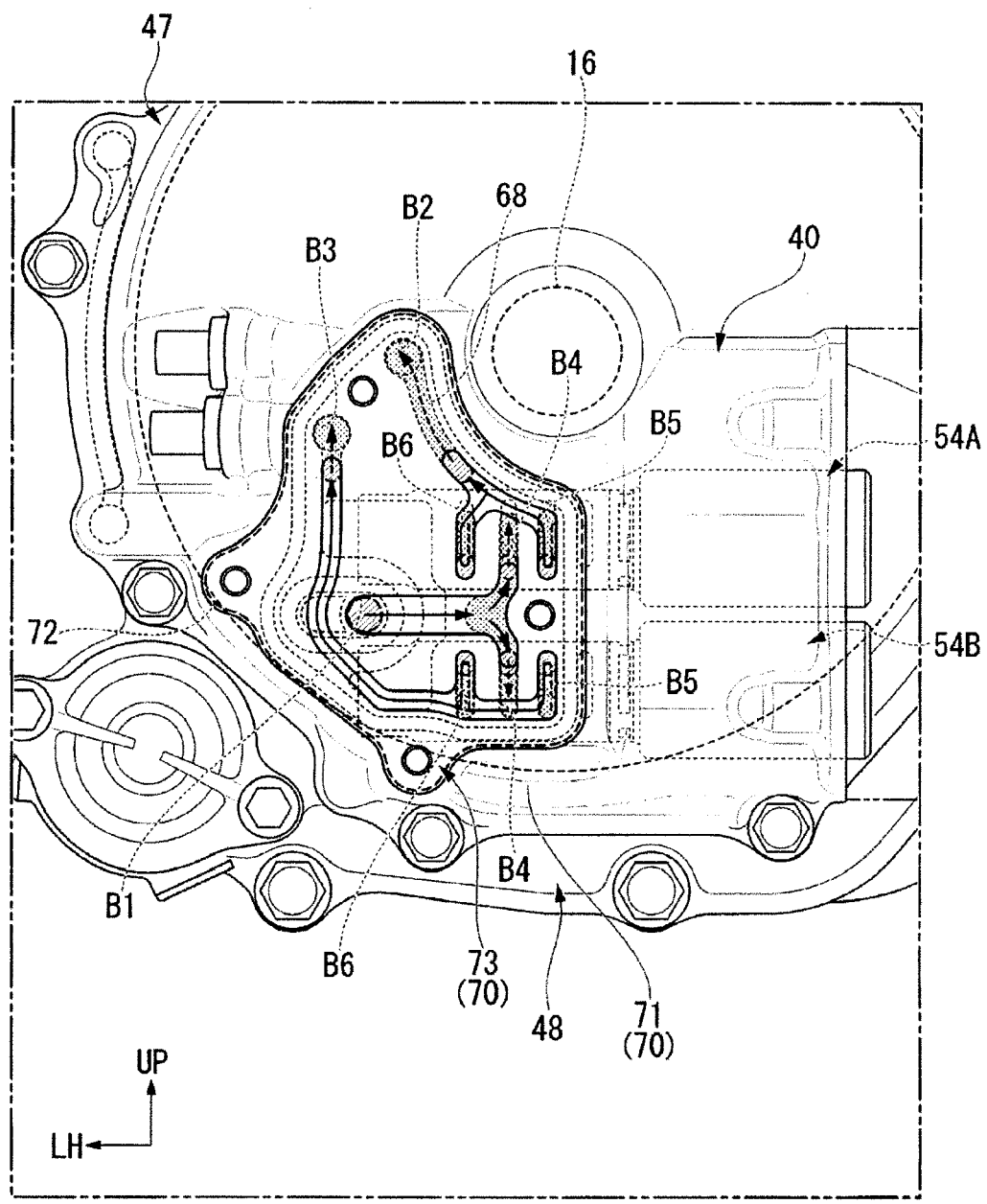
FIG. 9 is a rear view showing flows of oil in the oil pressure adjusting system of the power unit according to the embodiment of this invention.
Figure 10:
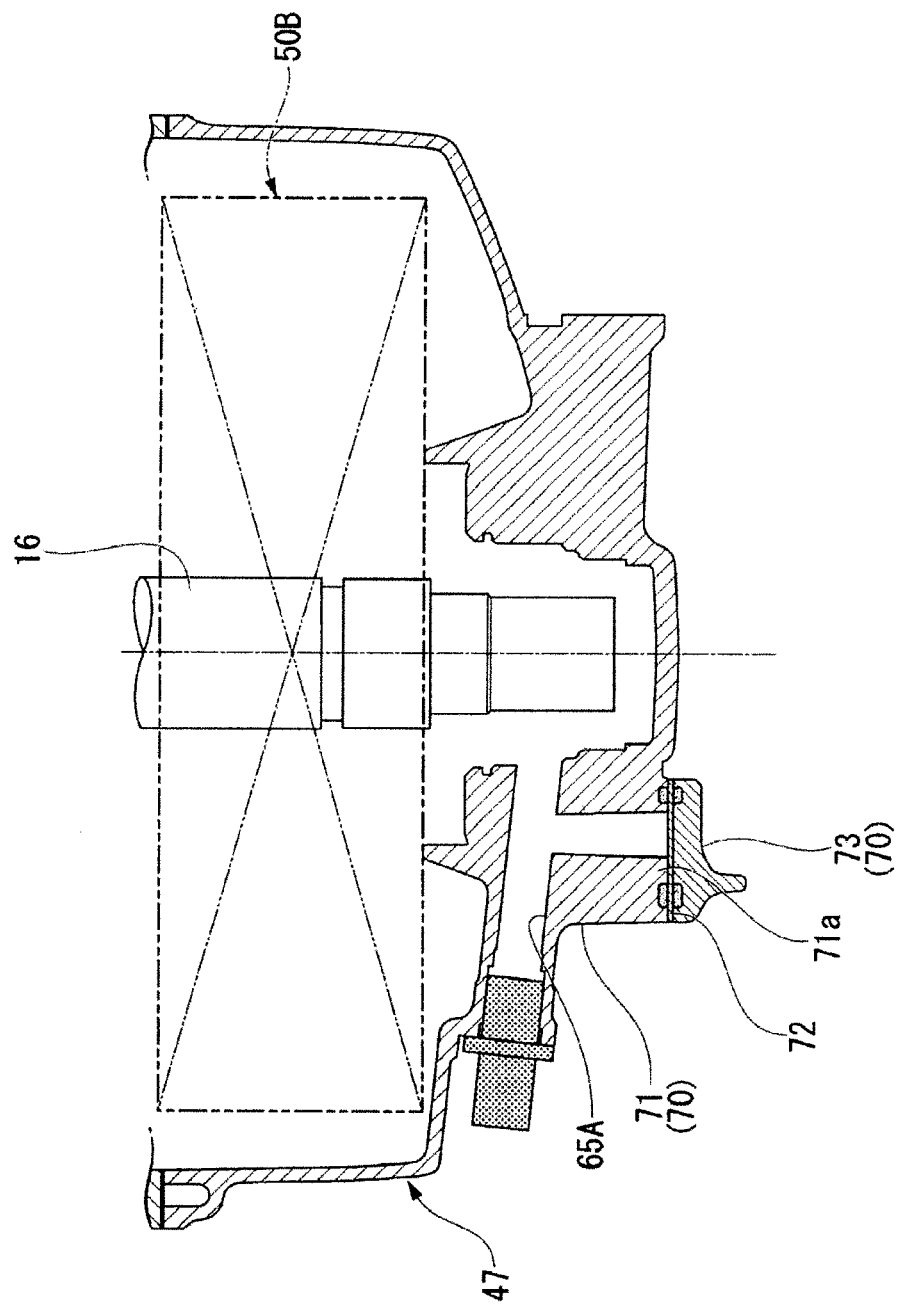
FIG. 10 is a sectional view of the power unit according to the embodiment of this invention corresponding to a section along line X-X in FIG. 5.
Figure 11:
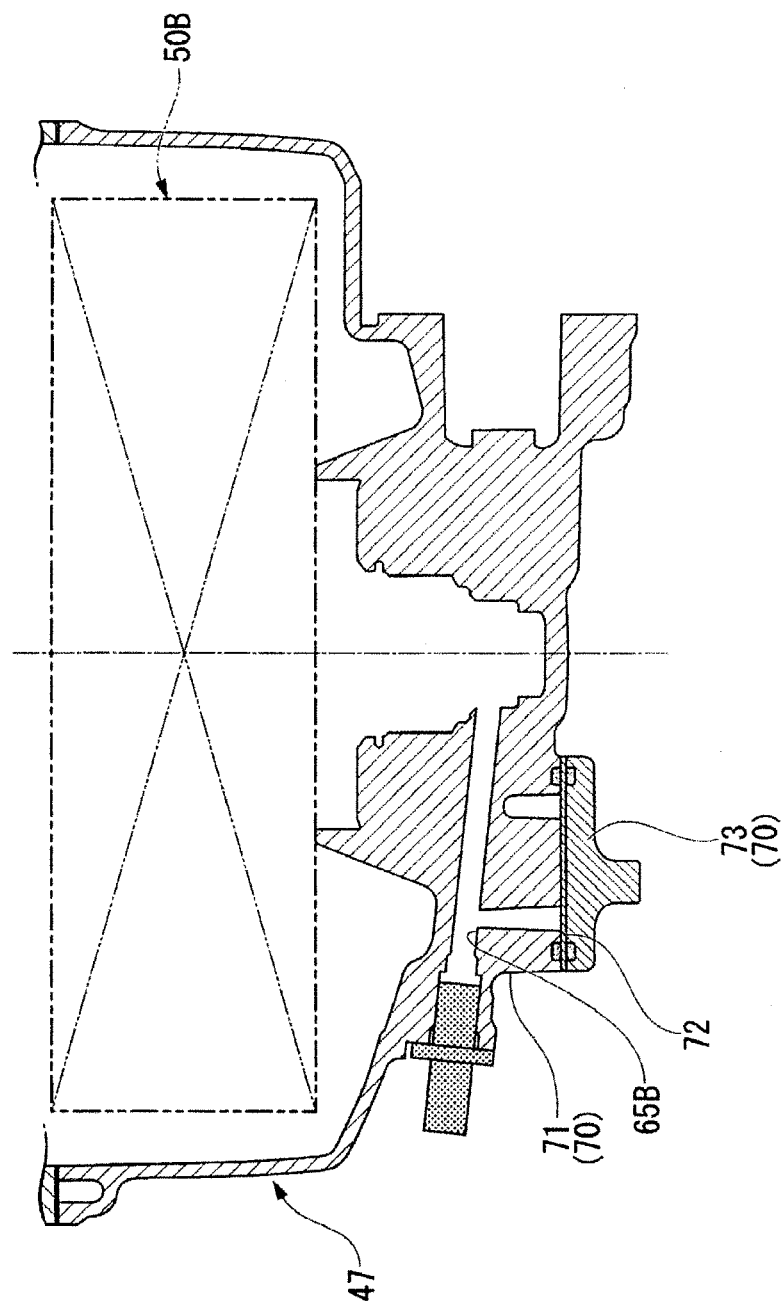
FIG. 11 is a sectional view of the power unit according to the embodiment of this invention corresponding to a section along line XI-XI in FIG. 5.
Figure 12:
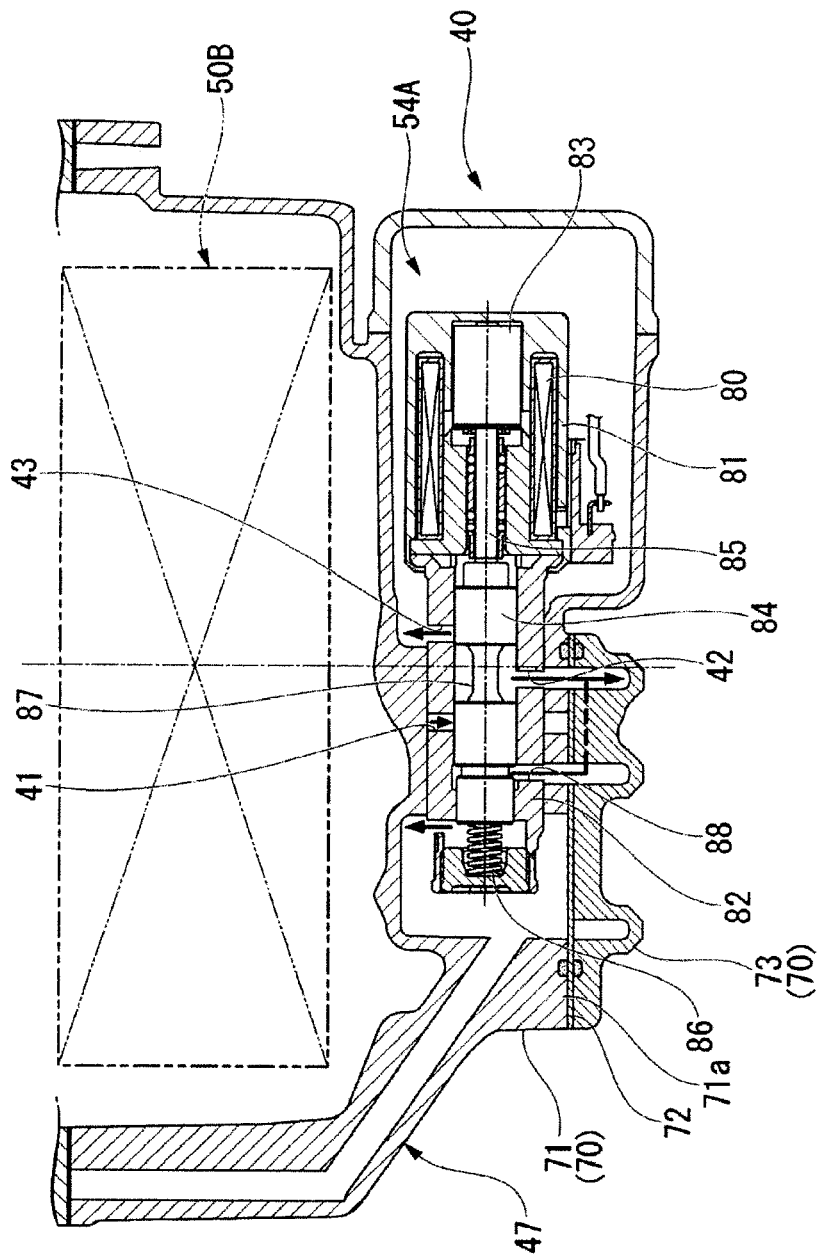
FIG. 12 is a sectional view of the power unit according to the embodiment of this invention corresponding to a section along line XII-XII in FIG. 5.

FIG. 7 is a diagram showing the back surface of the passage cover 73 and FIG. 8 is a diagram showing a partition plate 72 interposed between the casing main body part 71 and the passage cover 73. FIG. 9 is a diagram showing flows of oil in the oil pressure adjusting system 40 by arrows. FIGS. 10, 11, and 12 are sectional views corresponding to sections along line X-X, line XI-XI, and line XII-XII, respectively, in FIG. 5.

The valve units 54A and 54B of the oil pressure adjusting system 40 have substantially the same structure. Therefore, only one valve unit 54A shown in FIG. 12 will be described in the following.

The valve unit 54A includes an electromagnetic coil 80 whose applied current is controlled by the controller (not shown), a tubular wall 82 integrally attached to a housing 81 of the electromagnetic coil 80 coaxially, and a movable core 83 disposed in a space inside the electromagnetic coil 80 movably in the axial direction. The valve unit 54A further includes a spool valve 84 slidably housed inside the tubular wall 82, a joining rod 85 that joins the movable core 83 to the spool valve 84, and a return spring 86 that biases the spool valve 84 toward the initial position. In the tubular wall 82, an oil introduction port 41 connected to the side of the actuation oil pump 30, a control port 42 connected to the side of the hydraulic clutch 50A (side of the hydraulic clutch 50B, in the case of the valve unit 54B), and a drain port 43 to return excess oil to the oil reservoir 29 are formed. In the outer circumference of the spool valve 84, a ring-shaped trench 87 for selectively making the oil introduction port 41 and the drain port 43 communicate with the control port 42 is formed.

The valve units 54A and 54B operate basically based on the balance between a thrust force acting on the spool valve 84 by the electromagnetic coil 80 and a reaction force of the return spring 86, and cause the control port 42 to communicate with the drain port 43 when the electromagnetic coil 80 is in the off-state. When the electromagnetic coil 80 is excited, the spool valve 84 is displaced along the axial direction and the oil introduction port 41 is caused to communicate with the control port 42 as appropriate. The spool valve 84 is displaced to advance and retreat as appropriate according to current application control of the electromagnetic coil 80 and variation in the pressure on the side of the hydraulic clutches 50A and 50B, and thereby controls the supplied oil pressure to the hydraulic clutches 50A and 50B. In FIG. 12 a pressure adjustment port 88 is provided to cause the pressure of the control port 42 to act on the spool valve 84 in the return direction and suppress the sensitive variation of the spool valve 84.

The wall of the region to which the passage cover 73 is attached in the casing main body part 71 (clutch cover 47) may be referred to as a base wall 71a. The valve units 54A and 54B are housed and disposed on the back side of the base wall 71a (vehicle front side) in such a manner so as to be juxtaposed in parallel in the upward-downward direction. The valve units 54A and 54B are so disposed that the respective spool valves 84 are in parallel to each other and substantially horizontal.

As shown in FIG. 6, the following ports are formed in the base wall 71a: a base-side introduction port B1 communicating with the oil passage 39 on the discharge side of the actuation oil pump 30; a base-side supply port B2 communicating with a clutch passage 65A (see FIG. 10) leading to one hydraulic clutch 50A; another base-side supply port B3 communicating with a clutch passage 65B (see FIG. 11) leading to the other hydraulic clutch 50B; and base ports B4, B5, and B6 corresponding to the oil introduction ports 41, the control ports 42, and the pressure adjustment ports 88, respectively, of the respective valve units 54A and 54B.

Furthermore, as shown in FIG. 8, in the partition plate 72 overlapped on the base wall 71a, through-holes S1, S2, S3, S4, S5, and S6 communicating with the base-side introduction port B1, the base-side supply ports B2 and B3, and the base ports B4, B5, and B6, respectively, on the base wall 71a are formed.

Meanwhile, as shown in FIG. 7, the following trenches are made in the passage cover 73 overlapped over the partition plate 72: a connecting trench T1 that connects the base-side introduction port B1 and the upper and lower base ports B4 on the base wall 71a via the through-holes Si and S4 on the partition plate 72; a connecting trench T2 that connects the base ports B5 and B6 on the upper side and the base-side supply port B2 on the base wall 71a via the through-holes S5 and S6 on the upper side and the through-hole S2 on the partition plate 72; and a connecting trench T3 that connects the base ports B5 and B6 on the lower side and the base-side supply port B3 on the base wall 71a via the through-holes S5 and S6 on the lower side and the through-hole S3 on the partition plate 72.

Furthermore, as shown in FIG. 6, on the base wall 71a, an arc-shaped trench 68 extending from the base-side supply port B2 and curving into a circular arc shape around the main shaft 16 is formed. The base-side supply port B2 and the through-hole S2 on the partition plate 72 communicate with each other via this arc-shaped trench 68. In this embodiment, this arc-shaped trench 68 and part of the connecting trench T2 of the passage cover 73 form the circular arc part of the oil pressure passage extending while bypassing the main shaft 16.

The left and right exhaust pipes 90 connected to the left cylinder part 13L and the right cylinder part 13R of the power unit PU extend toward the vehicle body rear side via regions outside the clutch cover 47 and the oil pressure adjusting system 40 as shown in FIG. 2. Therefore, the oil pressure adjusting system 40 disposed at the rear part of the clutch cover 47 is disposed between the left and right exhaust pipes 90.

As shown in FIG. 2, the power unit PU is formed into a shape whose width gradually narrows in the downward direction in a rear view and the clutch cover 47 at the rear part is disposed at a lower-side position at substantially the center of the power unit PU in the vehicle width direction. Furthermore, the oil pressure adjusting system 40 is formed with a width totally smaller than the width of the lower half region of the clutch cover 47.

Furthermore, oxygen sensors 95 that detect the oxygen concentration in the respective exhaust pipes 90 are attached at substantially the same vehicle body anteroposterior position as the oil pressure adjusting system 40 in the extension direction of the left and right exhaust pipes 90. The oxygen sensors 95 are used for calculation of the air-fuel ratio in the engine 11 and for control of the combustion in the engine 11 and so forth.

In each of the oxygen sensors 95 attached to the left and right exhaust pipes 90, the projection part from the exhaust pipe 90 is inclined to be oriented toward the upper part of the inside in the vehicle width direction and faces a side surface of the oil pressure adjusting system 40. In the power unit PU of this embodiment, the casing portion 70 of the oil pressure adjusting system 40 has a smaller width (width in the vehicle width direction) than the rear crank cover 48 and the clutch cover 47. The projection part of each oxygen sensor 95 is disposed at such a position as to partly overlap with the clutch cover 47 in rear view and not to interfere with the oil pressure adjusting system 40.

As described above, in the motorcycle 1 according to this embodiment, in the power unit PU in which the crankshaft 15 is disposed along the vehicle body front-rear direction, the oil pressure adjusting system 40 for clutch operation is disposed at the rear part of the clutch cover 47 in such a manner so as to overlap with the hydraulic clutches 50A and 50B as viewed in the axial direction. Thus, the oil pressure adjusting system 40 and the hydraulic clutches 50A and 50B can be disposed close to each other without projecting the oil pressure adjusting system 40 to the lateral sides of the vehicle.

Therefore, in this motorcycle 1, while the oil pressure adjusting system 40 is disposed close to the hydraulic clutches 50A and 50B, the contact of the oil pressure adjusting system 40 with a road surface, a ground object, and so forth when the vehicle falls toward a lateral side can be avoided. Thus, it is possible to achieve protection of the oil pressure adjusting system 40 when the vehicle falls toward a lateral side and improvement in the actuation responsiveness of the hydraulic clutches 50A and 50B due to shortening of the oil pressure passage.

Furthermore, in the motorcycle 1 according to this embodiment, the oil pressure adjusting system 40 is disposed below the main shaft 16 and the internal passage (arc-shaped trench 68 and connecting trench T2) on the side close to the main shaft 16 in the oil pressure adjusting system 40 is formed into a circular arc shape around the main shaft 16. Thus, the centroid position of the whole of the power unit PU can be lowered downwardly by the oil pressure adjusting system 40 with a heavy weight. Therefore, the stability can be enhanced due to the lowering of the centroid of the vehicle.

Moreover, in this motorcycle 1, because the internal passage on the side close to the main shaft 16 in the oil pressure adjusting system 40 is disposed so as to bypass the main shaft 16 around in an arc manner, it is possible to easily ensure the placement space of clutch-peripheral components around the main shaft 16.

Furthermore, in the motorcycle 1 according to this embodiment, to the left cylinder part 13L and the right cylinder part 13R of the power unit PU, the exhaust pipes 90 extending from the lower side of them with bending toward the vehicle body rear side are connected. In addition, the oil pressure adjusting system 40 for clutch operation provided on the clutch cover 47 is disposed between the left and right exhaust pipes 90. Thus, in this motorcycle 1, the left and right exhaust pipes 90 can be disposed sufficiently close to the power unit PU without interference with components around the power unit PU.

Therefore, employing this structure can effectively narrow the vehicle width of the motorcycle 1.

Moreover, in the motorcycle 1 of this embodiment, the oxygen sensors 95 are disposed at substantially the same vehicle anteroposterior position as the oil pressure adjusting system 40 in the extension direction of the exhaust pipes 90 in such a manner so as to be inclined to be oriented toward the oil pressure adjusting system 40. This can easily narrow the vehicle width of the motorcycle 1 while avoiding the interference of the oxygen sensors 95 as components around the exhaust pipes 90 with the power unit PU.

This invention is not limited to the above-described embodiment and various design changes can be made without departing from the gist thereof. For example, the engine 11 incorporated in the power unit PU is not limited to the horizontally opposed engine and may be a multi-cylinder engine of another type, such as a parallel engine or a V-engine, or a single-cylinder engine as long as it is an engine in which the crankshaft 15 is disposed along the vehicle body front-rear direction.

Furthermore, vehicles to which this invention is applied are not limited to motorcycles (including motorized bicycles and scooter-type vehicles) and include also three-wheeled small vehicles (including vehicles with two front wheels and one rear wheel in addition to vehicles with one front wheel and two rear wheels) and four-wheeled small vehicles.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A saddle vehicle in which a power unit having an engine and a transmission includes hydraulic clutches for connecting and disconnecting power between the engine and the transmission, a clutch cover for covering an outside of the hydraulic clutches, and an oil pressure adjusting system that is attached to the clutch cover and controls an operation oil pressure of the hydraulic clutches, the power unit being supported by a vehicle body frame, the saddle vehicle comprising:
a crankshaft of the engine is disposed along vehicle front-rear direction;
wherein the oil pressure adjusting system is disposed so as to overlap with the hydraulic clutches as viewed in axial direction of the crankshaft.

2. The saddle vehicle according to claim 1, wherein:
the oil pressure adjusting system is disposed below a main shaft to which the hydraulic clutches are attached; and
an oil pressure passage for connecting an output part of the oil pressure adjusting system to the hydraulic clutches has a circular arc part that bypasses the main shaft.

3. The saddle vehicle according to claim 1, wherein the engine has a pair of cylinder parts on left and right sides and exhaust pipes extending from lower parts of the cylinder parts toward a vehicle rear side are each connected to a respective one of the cylinder parts, and the oil pressure adjusting system is disposed between the exhaust pipes on the left and right sides.

4. The saddle vehicle according to claim 2, wherein the engine has a pair of cylinder parts on left and right sides and exhaust pipes extending from lower parts of the cylinder parts toward a vehicle rear side are each connected to a respective one of the cylinder parts, and the oil pressure adjusting system is disposed between the exhaust pipes on the left and right sides.

5. The saddle vehicle according to claim 3, wherein an oxygen sensor is disposed at substantially the same vehicle anteroposterior position as the oil pressure adjusting system on the exhaust pipe in such a manner so as to be oriented toward the oil pressure adjusting system.

6. The saddle vehicle according to claim 4, wherein an oxygen sensor is disposed at substantially the same vehicle anteroposterior position as the oil pressure adjusting system on the exhaust pipe in such a manner so as to be oriented toward the oil pressure adjusting system.

7. A saddle vehicle wherein a power unit having an engine and a transmission comprising:
hydraulic clutches for connecting and disconnecting power between the engine and the transmission;
an oil pressure adjusting system attached to a clutch cover for controlling an operation oil pressure of the hydraulic clutches; and
a crankshaft of the engine is disposed along vehicle front-rear direction;
wherein the oil pressure adjusting system is disposed so as to overlap with the hydraulic clutches as viewed in axial direction of the crankshaft.

8. The saddle vehicle according to claim 7, wherein:
the oil pressure adjusting system is disposed below a main shaft to which the hydraulic clutches are attached; and
an oil pressure passage for connecting an output part of the oil pressure adjusting system to the hydraulic clutches has a circular arc part that bypasses the main shaft.

9. The saddle vehicle according to claim 7, wherein the engine has a pair of cylinder parts on left and right sides and exhaust pipes extending from lower parts of the cylinder parts toward a vehicle rear side are each connected to a respective one of the cylinder parts, and the oil pressure adjusting system is disposed between the exhaust pipes on the left and right sides.

10. The saddle vehicle according to claim 8, wherein the engine has a pair of cylinder parts on left and right sides and exhaust pipes extending from lower parts of the cylinder parts toward a vehicle rear side are each connected to a respective one of the cylinder parts, and the oil pressure adjusting system is disposed between the exhaust pipes on the left and right sides.

11. The saddle vehicle according to claim 9, wherein an oxygen sensor is disposed at substantially the same vehicle anteroposterior position as the oil pressure adjusting system on the exhaust pipe in such a manner so as to be oriented toward the oil pressure adjusting system.

12. The saddle vehicle according to claim 10, wherein an oxygen sensor is disposed at substantially the same vehicle anteroposterior position as the oil pressure adjusting system on the exhaust pipe in such a manner so as to be oriented toward the oil pressure adjusting system.

13. A saddle vehicle wherein a power unit having an engine and a transmission comprising:
hydraulic clutches for connecting and disconnecting power between the engine and the transmission;
an oil pressure adjusting system attached to a clutch cover for controlling an operation oil pressure of the hydraulic clutches; and
a crankshaft of the engine is disposed along vehicle front-rear direction;
wherein the oil pressure adjusting system is disposed so as to overlap with the hydraulic clutches as viewed in axial direction of the crankshaft.
said engine including a pair of cylinder parts on left and right sides and exhaust pipes extending from lower parts of the cylinder parts toward a vehicle rear side, each exhaust pipe being connected to a respective one of the cylinder parts;
said oil pressure adjusting system being disposed between the exhaust pipes on the left and right sides.

14. The saddle vehicle according to claim 13, wherein:
the oil pressure adjusting system is disposed below a main shaft to which the hydraulic clutches are attached; and
an oil pressure passage for connecting an output part of the oil pressure adjusting system to the hydraulic clutches has a circular arc part that bypasses the main shaft.

15. The saddle vehicle according to claim 13, wherein an oxygen sensor is disposed at substantially the same vehicle anteroposterior position as the oil pressure adjusting system on the exhaust pipe in such a manner so as to be oriented toward the oil pressure adjusting system.

\* \* \* \* \*